US010951890B1

(12) United States Patent
Dickson et al.

(10) Patent No.: US 10,951,890 B1
(45) Date of Patent: Mar. 16, 2021

(54) LOW-LATENCY, PEER-TO-PEER STREAMING VIDEO

(71) Applicant: PARSEC CLOUD, INC., Brooklyn, NY (US)

(72) Inventors: Christopher Dickson, New York, NY (US); Benjamin Boxer, Brooklyn, NY (US); Jamie Dickson, Austin, TX (US); Daniel Applegate, New York, NY (US); Jake Lazaroff, New York, NY (US); Sten Erik Persson Nygren, New York, NY (US)

(73) Assignee: Parsec Cloud, Inc., Brooklyn, NY (US)

( * ) Notice: Subject to any disclaimer, the term of this patent is extended or adjusted under 35 U.S.C. 154(b) by 103 days.

(21) Appl. No.: 16/045,975

(22) Filed: Jul. 26, 2018

Related U.S. Application Data (63) Continuation of application No. 15/981,217, filed on May 16, 2018, now abandoned.

(60) Provisional application No. 62/506,821, filed on May 16, 2017.

(51) Int. Cl.
| | |
|---|---|
| *G06F 15/16* | (2006.01) |
| *H04N 19/124* | (2014.01) |
| *H04L 29/06* | (2006.01) |
| *H04L 29/12* | (2006.01) |
| *H04L 29/08* | (2006.01) |

(52) U.S. Cl.
CPC ......... *H04N 19/124* (2014.11); *H04L 61/256* (2013.01); *H04L 65/1066* (2013.01); *H04L 65/4084* (2013.01); *H04L 65/60* (2013.01); *H04L 67/104* (2013.01); *H04L 69/164* (2013.01)

(58) Field of Classification Search
CPC ... H04N 19/124; H04L 65/60; H04L 65/1066; H04L 69/164; H04L 65/4084; H04L 67/104; H04L 61/256
See application file for complete search history.

(56) References Cited

U.S. PATENT DOCUMENTS

| | | | | |
|---|---|---|---|---|
| 2009/0115905 A1* | 5/2009 | Estrop | .................. | H04N 5/4448 348/598 |
| 2013/0273853 A1* | 10/2013 | Reed | ..................... | H04W 24/08 455/67.11 |
| 2014/0096165 A1* | 4/2014 | Bei | .................. | H04N 21/44209 725/81 |

(Continued)

*Primary Examiner* — John B Walsh
(74) *Attorney, Agent, or Firm* — Cooley LLP (57) ABSTRACT

Peer-to-peer video streaming software that takes video from a host's Graphical Processing Unit (GPU), moves it to the encoder, manages the color conversions, moves the video into the networking software, and in turn manages the video on a client. This software also handles the inputs from the client and tells the host how to react to the client's inputs. In executing the video streaming, the host broadcasts and renders the video that is or will be streamed. It encodes the video frame with a hardware encoder that is part of the GPU to eliminate latency associated with transferring frames to the central processing unit (CPU). The host transmits compressed video and audio data to the client, and the client uses its hardware decoder and the video streaming software to render the video. The client sends mouse, keyboard, joystick, and controller signals to the host, which varies the bit rate based on the network connection.

13 Claims, 8 Drawing Sheets

(56) References Cited

U.S. PATENT DOCUMENTS

| | | | |
|---|---|---|---|
| 2015/0142830 A1* | 5/2015 | Klawitter | G06Q 50/01 |
| | | | 707/754 |
| 2016/0027143 A1* | 1/2016 | Amidei | G06F 3/1454 |
| | | | 345/522 |
| 2016/0292812 A1* | 10/2016 | Wu | G06F 1/3237 |
| 2018/0276621 A1* | 9/2018 | Madejczyk | G06Q 10/1095 |
| 2018/0302370 A1* | 10/2018 | Nakahara | H04L 61/2546 |

* cited by examiner

LOW-LATENCY, PEER-TO-PEER STREAMING VIDEO

CROSS-REFERENCE TO RELATED APPLICATIONS

This application is a continuation of U.S. application Ser. No. 15/981,217, filed on May 16, 2018, which in turn claims priority to and benefit of U.S. Application No. 62/506,821, filed on May 16, 2017; the entirety of each of the aforementioned applications is herein expressly incorporated by reference for all purposes.

BACKGROUND

Streaming technology enables a host to share video with one or more clients via a connection over the internet or another communications network.

SUMMARY

Streaming technology can be used to share live images acquired by a camera, live audio acquired by a microphone, or data rendered on the screen of the host, such as a screen share of a video game or recorded video playing on the host display. Unfortunately, current streaming technology often produces a perceptible lag at the client. If this lag is more than about 16.67 ms (the time it takes to render one frame at 60 frames per second (fps)), it may be perceptible to the person using the client, interfering with that person's ability to enjoy streaming video or play a streaming video game.

The lag, or latency, is usually caused by some combination of the network that connects the host and the client or the hardware used to render the video. For a packet-switched network like the internet, network latency depends on network bandwidth, packet loss and jitter, and network latency. Network bandwidth is a measure of how many packets the network can transmit between endpoints in a given period; generally, higher bandwidth is better. Packet loss is a measure of how many packets reach their destination(s). Jitter represents the difference between each packet's expected and actual arrival times. And network latency represents how long it takes a packet to traverse the network. Network latency depends on the physical path length between endpoints and the priority afforded each packet as it travels along that path. Hardware latency depends on the operations performed by the host and client computers to capture, compress/encode, transmit, receive, decompress/decode, and render the individual video frames in the video stream. Generally, more operations translates to higher latency According to some embodiments of the disclosure, low-latency game or video streaming technology delivers high frame rate video streams across the internet from a first peer (the host) to a second peer (the client). It uses a Desktop Duplication application programming interface (API) to capture frames in video memory and a hardware encoder on the host's graphics processing unit (GPU) to compress the frames using the H.264 or H.265 codec. Similarly on the client side, the encoded frame is received over the network and loaded into GPU memory. After decompression, the frame is displayed using low-level, platform-specific graphics API to make sure little to no latency is added as the frame is rendered to the screen.

To reduce hardware latency, the raw video frame does not touch system memory at the host during capture, encoding, or transmission. Allowing the raw frame to touch system memory would require the host central processing unit (CPU) to copy raw frame data from the GPU. Instead, the raw captured frame passes directly to the host GPU's hardware encoder, then once the frame is decoded into video memory on the client, it is rendered to the screen directly without any intermediate CPU operations. Any copy into system memory can have a noticeable latency impact.

To reduce network latency, the host transmits the video frames to the client using a reliable networking protocol built on user datagram protocol (UDP). This networking protocol optimizes the exchange of unbuffered, low-latency, high frame rate video across the internet over latency, consistent frame rates, and video quality. This networking protocol works closely with the encoding pipeline to dynamically adjust the amount of data passed between the two peer computers to reduce the latency in the video.

The connection also enables emulating a mouse locally (on the client) that mimics the mouse on the host, giving the appearance of lower latency input and mouse movement. The user sees the "local mouse," i.e., the cursor representing the client mouse, trackpad, or touchscreen that the user is physically manipulating. This gives the appearance of lower latency because it eliminates the need to transmit the user's mouse inputs to the host and host's response to those inputs back to the client before rendering a change in the mouse's location on the client display. (The client still transmits the user's mouse inputs to the host.) The host transmits the image of the cursor and responses to the user's mouse inputs to the client, and the client changes the displayed cursor to match the image of the cursor from the host.

The peers can connect to each other using a peer-to-peer network address translator (NAT) traversal system with a 95% connection success rate. When a user attempts to connect to another PC, both sides of the connection make a request to a Session Traversal of UDP for NAT (STUN) server, also called a signal service. Each peer in the peer-to-peer connection tells the STUN server its local internet protocol (IP) address for the computer and a route that data packets should take to reach it. This route may be obtained from an internet service provider (ISP) or other network provider. Allowing either peer to initiate the connection (the guest or the host) increases the likelihood of success versus similar STUN services.

Embodiments of the present technology include a method of peer-to-peer streaming video. An example of this method includes establishing a connection between a first peer and a second peer on a computer network. A first graphics processing unit (GPU) on the first peer captures a video frame. A first hardware encoder on the first peer compresses the video frame based on a quantization parameter (QP) or a bit rate, which are based on the connection between the first peer and the second peer (e.g., the connection's bandwidth, latency, or frame drops). The first peer transmits the compressed video frame to the second peer.

Establishing the connection between the first peer and the second peer may include (1) requesting, by the first peer, a connection to the second peer via a Session Traversal of User Datagram Protocol (UDP) through Network Address Translators (NATs) (STUN) server; (2) establishing, by the first peer, a network address and a port via a universal Plug-and-Play (uPnP) protocol; or (3) sending a first packet from a first port on the first peer to the second peer, detecting that the first packet has been dropped, and receiving a second packet from the second peer at the first port. The connection may include a first connection for audio data, a second connection for video data, a third connection for cursor data, and a fourth connection for user input.

The video frame can be captured from a back buffer of the first GPU. Capturing the video frame, compressing the video frame, and transmitting the compressed video frame may occur without copying the video frame from the first GPU to a central processing unit (CPU).

The first hardware encoder may compress the video frame using at least one of an H.264 or H.265 compression standard.

In addition, the first GPU may render the video frame on the first peer.

converting the video frame from a first color format to a second color format with at least one shader on the first GPU. A second video encoder decompresses the compressed video frame at the second peer to recover the video frame, and a second GPU on the second peer renders the video frame.

Before establishing the connection, a user may set a permission on the first peer. This permission limits access by the second peer to an application window rendered by the first GPU on the first peer when the application window is rendered in a foreground of a display of the first peer. If the video frame is from an app executed by the first peer, the first peer may issue an invitation from the first peer to use the app before establishing the connection. Also before establishing the connection, the first peer can receive, from a server, an indication of a match to the second peer. This match may be based on a distance between the first peer and the second peer or bandwidth available for the connection between the first peer and the second peer.

Another example method of streaming video between a first peer and a second peer on a computer network includes setting a permission on the first peer. This permission limits access by the second peer to system resources of the first peer, e.g., to a first window displayed on the first peer. Next, the first peer receives a request for a connection from the second peer. The first peer accepts the request for the connection from the second peer, and the first and second peers establish the connection with each other on a computer network. The first peer captures a video frame rendered by its GPU in the first window displayed by the first peer. A hardware encoder on the GPU compresses the video frame, and the first peer transmits the compressed video frame to the second peer via the connection.

If the first peer displays a second window in response to a command from a user of the first peer, the first peer may transmit an indication to the second peer that the second peer lacks permission to access the second window.

All combinations of the foregoing concepts and additional concepts discussed in greater detail below (provided such concepts are not mutually inconsistent) are part of the inventive subject matter disclosed herein. In particular, all combinations of claimed subject matter appearing at the end of this disclosure are part of the inventive subject matter disclosed herein. The terminology used herein that also may appear in any disclosure incorporated by reference should be accorded a meaning most consistent with the particular concepts disclosed herein.

BRIEF DESCRIPTIONS OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

The inventive video streaming technology can connect two computers in a peer-to-peer connection for streaming video with much lower latency than other video streaming technology. In some embodiments, it can operate with an added latency of only 7 milliseconds (ms) on a local area network (LAN) Ethernet connection. In some embodiments, it can operate with an added latency of less than 10 ms, less than 9 ms, less than 8 ms, less than 7 ms, less than 6 ms, or less than 5 ms on a LAN Ethernet connection. In some embodiments, it uses low-latency desktop capture, hardware encoding with the H.264 or H.265 codec, and low-level frame timing and synchronization optimizations to reduce or minimize hardware latency. In addition, it operates a zero-copy graphics processing unit (GPU) pipeline to the encoder at the host—it doesn't copy the video frames being transferred to the central processing unit (CPU), reducing hardware latency even further. Hardware decoding at the client further reduces hardware latency, for a smooth 60 fps stream at the client.

The inventive video streaming technology also takes advantage of peer-to-peer Network Address Translator (NAT) traversal to establish a connection between peers. The inventive NAT traversal techniques increase the changes of connecting successfully on the first try, with demonstrated first-try connection rates of 95%. Once connected, the host can stream video frames to the client with the User Datagram Protocol (UDP) for the lowest possible network latency. And the hardware may adjust the bitrate as the network conditions change, further reducing latency.

Examples of the inventive technology are built to work so any machine with an H.264, H.265, or other suitable hardware encoding bloc can be a server in a peer-to-peer video streaming network. A user can install the video streaming software on his computer, run the host/server, and immediately access this server from his local network or from a wide area network. He may also invite friends to access his server. When a friend connects, that friend may either have full permission to access the machine or he may request approval for accessing the machine at the time of connection.

The inventive technology builds on the very recent confluence of increasing bandwidth, ubiquitous access to H.264 or H.265 compression hardware, and distribution of cloud data centers. It can be used to make personal computer (PC) gaming more accessible and available from anywhere. Other applications include, but aren't limited to streaming data for image rendering in healthcare (e.g., for telemedicine), Computer Aided Design, augmented reality, virtual reality, mixed reality, and image processing for analyzing video and images with artificial intelligence. It can deliver an almost native experience for practically every use-case for a computer. The proliferation of inexpensive hardware encoders along with advancements in GPUs make it possible for almost any device built after 2012 to run examples of the inventive software.

Finally, the proliferation of cloud technology is resulting in a massive investment across the three largest providers of cloud data centers. Investments are being made in the GPU instances because they are valuable for artificial intelligence. Those same GPU instances can be used for gaming in the cloud. With Amazon, Microsoft, and Google investing in GPU instances and distributing them across the globe, the inventive technology could reach gamers all over the world.

Low-Latency, Peer-to-Peer Video Streaming

Figure 1:
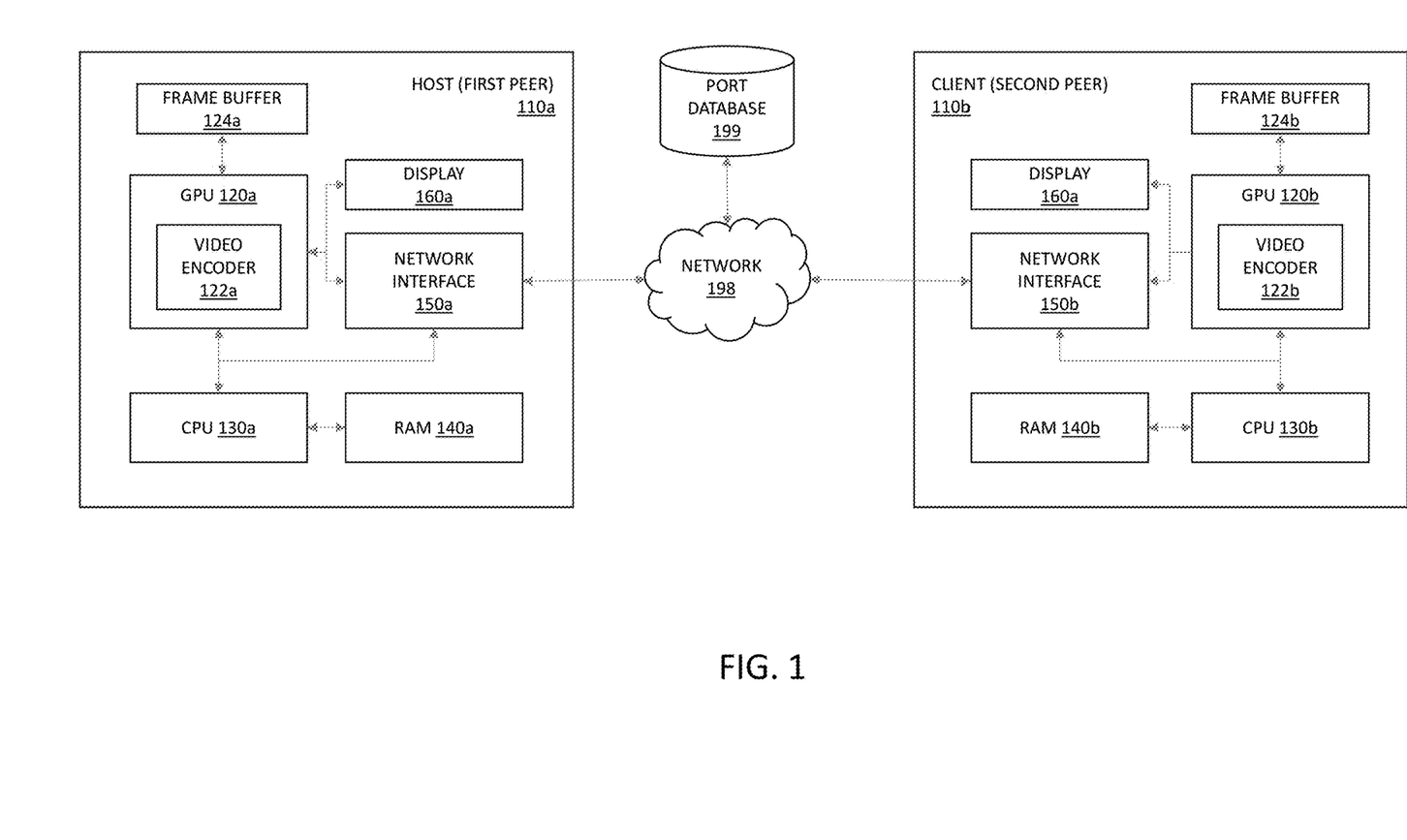
FIG. 1 is a block diagram that illustrates hardware used for low-latency, peer-to-peer video streaming.

FIG. 1 shows two peer computers, or peers—here, a first peer 110a and a second peer 110b—connected to each other via a computer network 198. Each peer 110a/b includes a GPU 120a/b, each of which includes a respective video encoder/decoder 122a/b ("video encoder" for short). Each GPU 120a/b is coupled to a frame buffer 124a/b, CPU 130a/b, network interface 150a/b, and display 160a/b. The CPU 130a/b is connected to a random access memory (RAM) 140a/b. And each GPU 120a/b includes a respective video encoder 122a/122b. Each peer 110a/b may also include any number of other components as known in the art, including but not limited to power supplies, additional memory, etc. The peers 110a and 110b may also connect, via the network 190, to a port or hole-punch database that collects and stores the ports available on each peer for peer-to-peer streaming connections.

Figure 2:
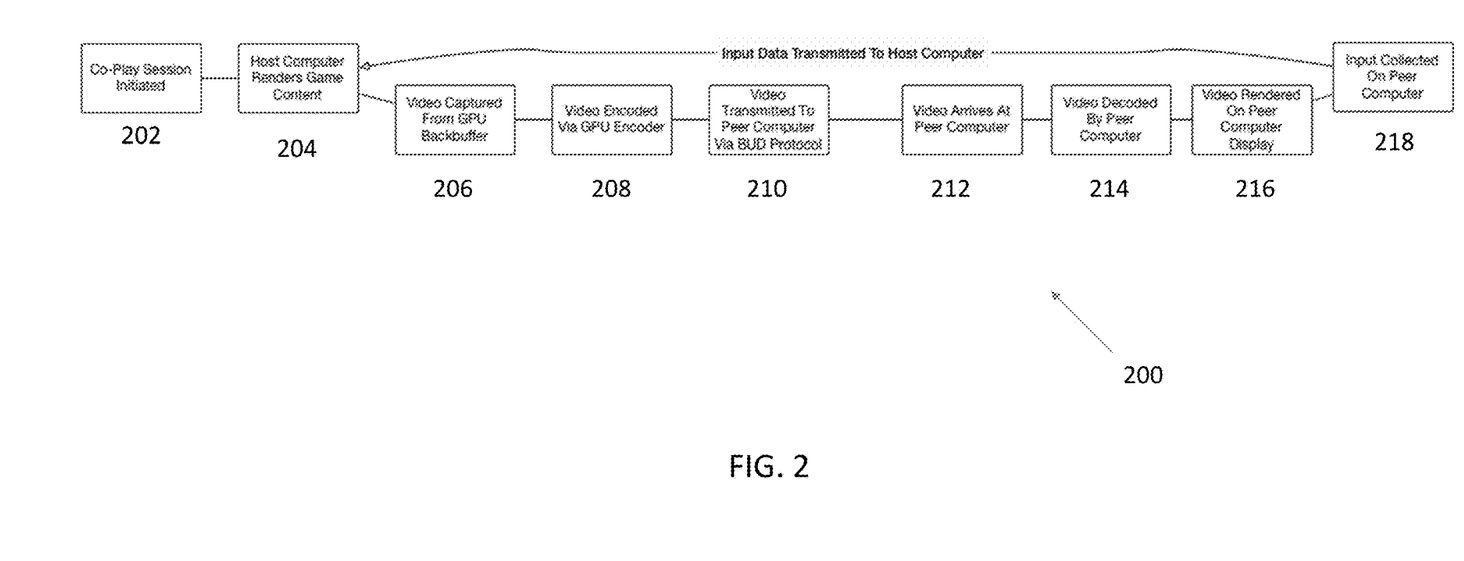
FIG. 2 is a flowchart detailing a method for low-latency, peer-to-peer video streaming.

FIG. 2 illustrates a low-latency, peer-to-peer process 200 of streaming video, e.g., for gaming, between the peers 110a and 110b shown in FIG. 1. This process 200 includes: initiating a co-play session (202), which may involve establishing a peer-to-peer connection between the host 110a and the client 110b; rendering a video frame on the host display 160a with the host GPU 120a (204); capturing a raw (uncompressed) video frame on the host 110a using the host GPU 120a (206); compressing the captured video frame using the video encoder 122a in the host GPU 120a (208); transmitting the compressed video frame from the host 110a to the client 110b (210); receiving the compressed video frame at the client 110b (212); decompressing the encoded video frame on the client 110b using the host video decoder 122b (214); rendering the decompressed video frame on the client display 160b using the client GPU 120b; and collecting user input on the client 110b and transmitting the user input to the host 110a (218). This user input may include commands for playing the game, etc., including mouse clicks, mouse movements, joystick button presses, or keyboard keystrokes. These steps are explained in greater detail below.

The peers may exchange video frames and user input using a reliable UDP protocol called Better User Datagrams (BUD). BUD is a reliable protocol in the sense that it handles reordering of packets and retransmission of dropped packets. However, BUD does not have any of the other overhead of TCP. Instead, BUD uses low-level packet loss information to make quick decisions on how to alter the bit rate controlled by the H.264 or H.265 encoder. BUD reports congestion window increases each frame to the encoder and uses the H.264 or H.265 bit rate as a lever to control congestions. This allows for much faster response to loss events while maintaining low latency. BUD can also make decisions on which packets can be safely dropped vs. retransmitted. This is an advantage over TCP, which retransmits all packets indiscriminately.

Rendering a Video Frame on a Host

Once a peer-to-peer connection between the host 110a and the client 110b has been established, the host 110a can begin rendering video to be streamed to a client (204). The video can originate from various video sources including, but not limited to, movies, video games, or a remote desktop. Streaming data may also include audio data, which can be processed in tandem with the video frame data. The host 110a renders the video frames using the frame buffer, which is a portion of memory that stores frame data, e.g., in the form of a bitmap, for rendering on the display 160a. The frame buffer 124a can be implemented as video memory on or coupled to the GPU 120a and configured to receive frame data generated by the GPU 120a. Normally, frame data stored in the frame buffer 120a is sent directly to a device, e.g., a monitor 160a, for display. Frame data stored in the frame buffer 124a can also be refreshed, e.g., new frame data replaces old frame data, at a particular frame rate, e.g., 60 fps, when rendering video.

Capturing a Video Frame on a Host

For peer-to-peer video streaming, video frames rendered on the host 110a are captured (206) for compression and transmission to the client 110b. Video frames can be captured by creating a copy of the frame data stored in the frame buffer 124a. The captured video frame is stored in video memory on the GPU 120a in order to avoid latency costs associated with copying the frame data from the GPU 120a to system memory, e.g., RAM 140a, using the CPU 130a. In other words, the host 110a doesn't copy the captured video frame from the GPU 120a to the CPU 130a or RAM 140a. This is the "zero-copy GPU pipeline to the encoder at the host" mentioned above.

An application programming interface (API) controls how the GPU 110a copies frame data from the frame buffer 124a and stores the frame data in video memory. A low-level API, e.g., a set of subroutines with little abstraction such as machine code or an assembly language, can be used to capture video frames more quickly. For example, a low-level Windows Operating System API, such as the Desktop Duplication API, can be used to transfer frame data from the frame buffer 124a to video memory for processing. Using a low-level API to transfer frame data also reduces hardware latency.

Video Frame Encoding on a Host

In order to transmit the captured video frames to a client at a desired frame rate, the captured video frames are compressed (208) using the video encoder 122a before transmission. Compressing the video frame reduces the amount of data streamed across the network 198, reducing the bit rate, which can allow for smooth video streaming particularly for networks with more limited bandwidth. In order to compress video frames more quickly, a hardware-enabled video encoder (e.g., video encoder 122a), such as a special application specific integrated circuit (ASIC) on a GPU, can be used instead of a software encoder. (Because the encoder compresses the video frames, the terms "encoding" and "compressing" are used relatively interchangeably in this specification.) Typically, a hardware-enabled video encoder is configured to encode or decode certain video codecs. For example, the host video encoder 122a may use the H.264 standard, which is one of the most widely supported video codecs. Compared to older compression standards, the H.264 standard can provide the same quality at half the bit rate. The video encoder 122a can also use the H.265 standard to further reduce the bit rate.

The process of compressing video frames stored in video memory can be accomplished by using an API configured to interact with the video encoder 122a. However, most hardware vendors typically use a proprietary API based on a high level programming language, e.g., C, to interact with their respective hardware, which can result in API-specific problems and performance tweaks. In order to more quickly and more reliably encode a video frame, the host video encoder 122a can use a hardware-specific, low-level encoding library. With this library, the video encoder 122 can operate with an encoding latency of less than 10 milliseconds. The frame stays in GPU memory throughout this encoding process.

Transmitting the Video Frame from the Host to the Client

The host 110a transfers the compressed video frame to the client 110b as a stream of data packets using a previously established peer-to-peer connection (210). The video frame can be transferred directly from the host's GPU video memory to the client's GPU video memory. In this manner, the CPUs 130a/b on the host 110a and the client 110b don't need to be used to transfer the video frame, eliminating the latency associated with using a CPU to process a video frame.

As described above, the peer-to-peer connection can be maintained by a networking protocol, e.g., better user datagrams (BUD), UDP, or transmission control protocol (TCP), which can monitor packet loss, reorder packets, and retransmit dropped packets. (BUD is a UDP-based protocol focusing on high reliability and low latency transmission of large packets.) The networking protocol can also be used to dynamically adjust the video encoding bit rate in the event of packet loss, e.g., if a client does not receive packets from a host, or network congestion, e.g., packets accumulate in a buffer when a host sends more packets than the client 110b can process. Low-level packet loss information can be used to reduce the time to adjust the encoder bit rate, allowing for a faster response to loss events or congestion while maintaining low latency.

Figure 3A:
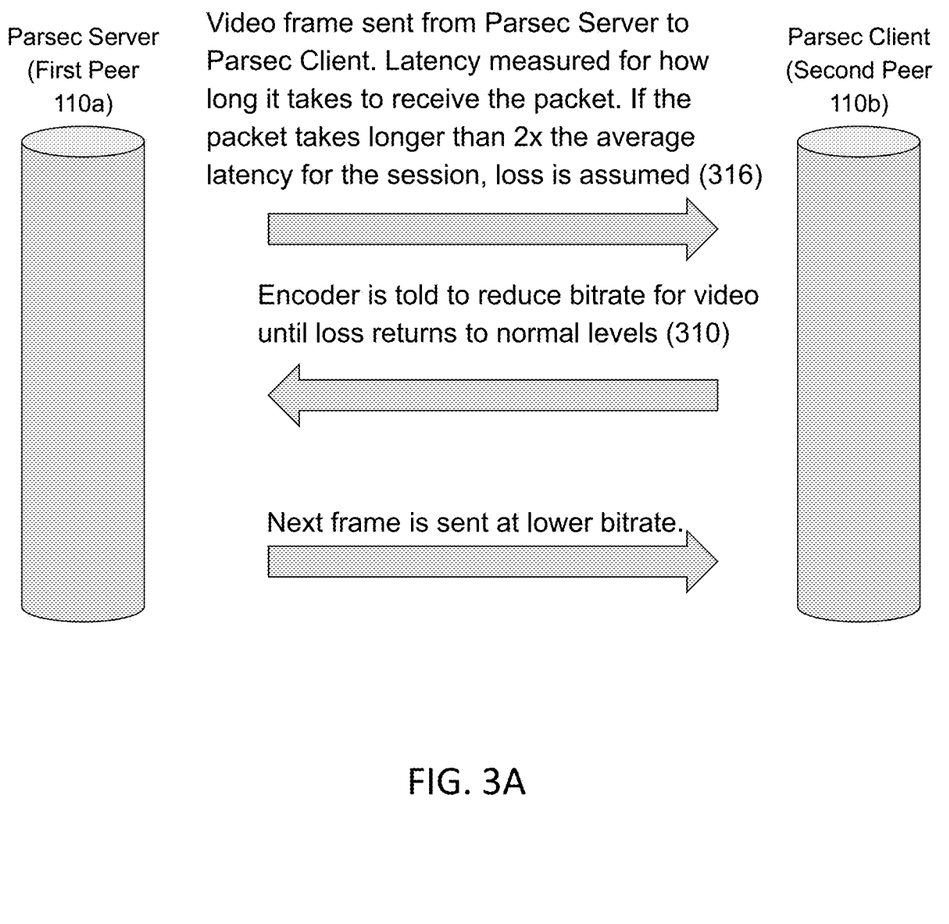
FIG. 3A is an illustration detailing the various steps to dynamically adjust an encoder bitrate due to packet loss or network congestion.
Figure 3B:
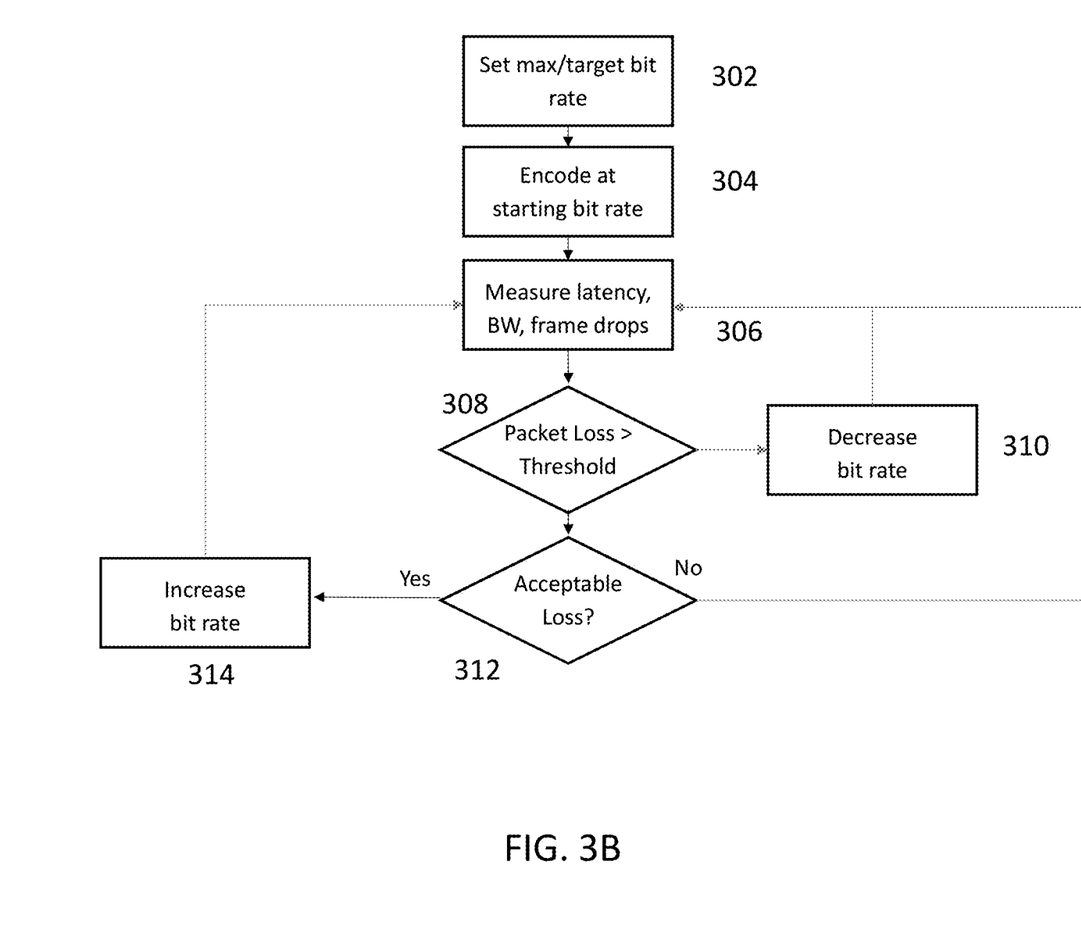
FIG. 3B is a flowchart detailing a method of adjusting an encoder bitrate in response to packet loss between a host and a client.

FIGS. 3A and 3B illustrate dynamic adjustment of the encoding bit rate in response to packet loss, congestion, or undesirably high latency. FIG. 3A illustrates an overview of a typical dynamic bit rate adjustment. The host 110a sends video frames to the client 110b at a target bit rate or quantization parameter (QP). The QP determines how much spatial detail is saved during compression by the encoder. It is a measure of compression loss. The lower the compression loss/QP, the more spatial detail saved during compression and the better the video quality. A lower compression loss also translates to a higher bitrate. Thus, a lower QP translates to a higher bit rate. The system uses a video buffering verifier (VBV) with the QP to determine a maximum bitrate for a specific compressed frame. That maximum bit rate is set by the user or by BUD based on how much bandwidth is available between the host and the guest.

The bandwidth, latency, and/or packet loss affect the bit rate. If a given packet doesn't arrive after twice the average latency (e.g., if the average latency is 10 ms, and the packet hasn't arrived after 20 ms), the client 110b assumes that the packet has been lost. In response to the packet loss, the client 110b transmits a signal to the host 110a indicating the packet loss. And in response to this signal, the host 110a adjusts the bit rate or QP for the encoder and sends subsequent frames at a lower bit rate or QP until the bandwidth, latency, and/or packet loss of the network connection return to normal levels.

FIG. 3B shows a more comprehensive process 300 for adjusting the bit rate based on the network connection between the host 110a and the client 110b. To start, the user, the host 110a, or the client 110b sets a maximum bit rate for the streaming session (302). With these targets set, the host 110a begins encoding video frames at a bit rate below the target bit rate (e.g., 3 megabits per second (Mbps)) transmitting them to the client 110b (304), which measures the and/or packet loss of the network connection (306). The host 110a may transmit data over four separate network connections—one each for audio, video, mouse, and user input. This allows the audio, video, mouse, and user input to occur simultaneously, reducing latency.

The network protocol (e.g., BUD) measures the loss on the packets by measuring the time it takes for the client 110b to receive a frame (308). If it takes too long for the frame to arrive, BUD recognizes that loss is occurring (310) and reduces the encoder bit rate, e.g., by 50%, in response to this loss (312). BUD continues to reduce the bit rate until the loss falls below a threshold (e.g., no loss is detected). If there is acceptable loss (e.g., no loss) on video packets (314), BUD tells the host encoder 122a to begin to increase the acceptable bit rate of the compressed video (316). It increases the bit rate of the compressed video until it reaches the maximum bit rate or until it begins to recognize loss.

In the process 300 in FIG. 3B, the client 110b can also report increases in a congestion window, which is a dynamic variable that limits the amount of data that can be sent along a network. The host 110a may use this information to adjust the encoder bit rate in order to reduce congestion in (310). For example, adjustments to the bit rate can be based on a cubic function, $B_e = B_{e-1} + \alpha(DT_e)^3$, where $B_e$ is the new bit rate after adjustment, $B_{e-1}$ is the old bit rate based on the most recent change to D, $\alpha$ is a parameter controlling the speed of reaction, and $T_e$ is the period of time since the last change in D. D is a parameter with a value of either −1 corresponding to when the network is in a state of congestion, e.g., the accumulation of packets in a buffer when a host sends more packets than a the client can handle, or 1 otherwise. The new bit rate, $B_e$, can also be capped between a minimum and maximum allowable bitrate defined by the host or the user.

Video Frame Decoding on the Client

Once the client 110b receives the encoded video frame, the client video encoder 122b can then decompress the encoded video frame (214 in FIG. 2). Hardware-enabled video decoders, e.g., ASICs, on a GPU, can be used to decompress the video frame more quickly than software decoders. Like the encoder 122a used to compress the video frame at the host 110, the decoder 122b can use an API to facilitate the decoding process. For instance, it may use a hardware-specific, low-level decoding library to decode video frames more quickly and more reliably than a high-level API.

The decoder 122b converts the compressed video frame, e.g., a frame in a H.264 format, into an image with a luminance-chrominance (YUV) color format, e.g., NV12. The YUV color format may be incompatible with graphics APIs, e.g., OpenGL, DirectX, which render video frames with a red-green-blue-alpha (RGBA) color format. To alleviate this problem, the decompressed video frame may be converted from a YUV color format to a RGBA color format for rendering on the client display 160b (216). The conversion between the YUV format and the RGBA format can lead to large latency penalties if performed by the client CPU 130b. In order to reduce latency costs, the format conversion can be performed by the client GPU 110b using pixel shaders, e.g., OpenGL for MacOS systems, DirectX 9 or 11 for Windows systems. The final color conversion renders the raw frame directly to the back buffer, which can then be efficiently displayed on the screen. The raw frame never leaves the GPU, improving latency and saving the CPU a lot of extra work.

Rendering the Video Frame on the Client

After the client's GPU converts the video frame into a RGBA format, the converted video frame can be loaded directly into the client back buffer to facilitate rendering (216). The back buffer is a secondary portion of memory in the client frame buffer 124b used to preload frame data as another frame is being rendered on a front buffer. Once frame data is loaded into the back buffer, the frame can be sent directly to the client monitor 160b for display as new frame data is loaded into the front buffer. In this manner, the back buffer becomes the front buffer and the front buffer becomes the back buffer. Low-level, platform-specific graphics APIs can be used to reduce latency when rendering a video frame on the client display 160b.

Collecting User Input from the Client and Transmitting User Input to the Host

As video frames are rendered on a client, the user can apply an input that changes the video frames rendered on the host in process 1800. For example, in applications such as gaming or remote desktop use, the user input can be a keystroke. The keystroke can be transmitted from the client to the host where the host CPU or GPU uses the keystroke as an input to generate a new video frame for rendering. User inputs can originate from various types of user input devices including, but not limited to, a mouse, a keyboard, a joystick, a gamepad, a virtual reality headset, gyroscope, accelerometer, and other controller devices coupled to the client. User inputs can be transmitted from the client to the host using the parallel network connections created initially when establishing a peer-to-peer connection between the host and the client in process 1100.

Setting Up a Peer-to-Peer Connection

Figure 4A:
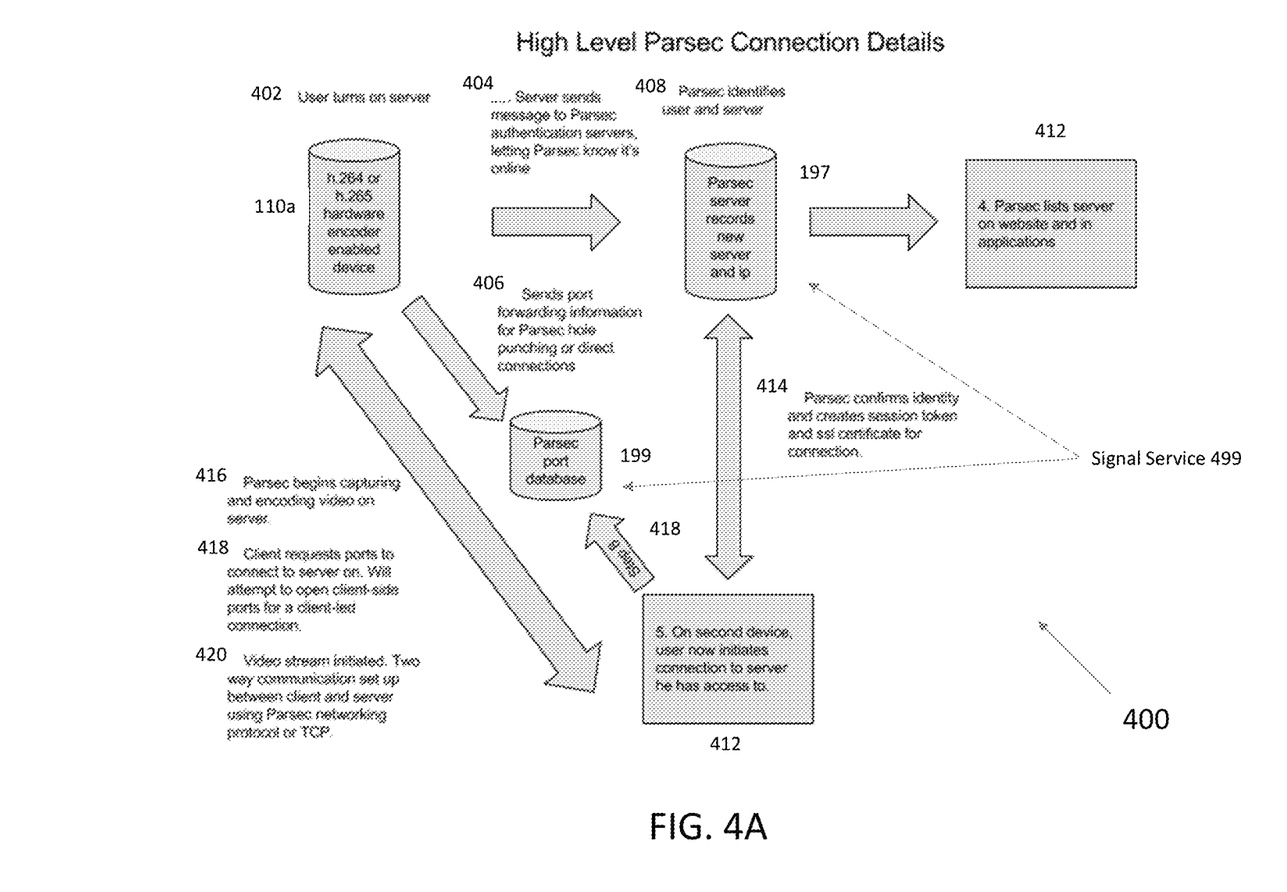
FIG. 4A is a flowchart detailing a method of establishing a peer-to-peer connection between a host and a client.
Figure 4B:
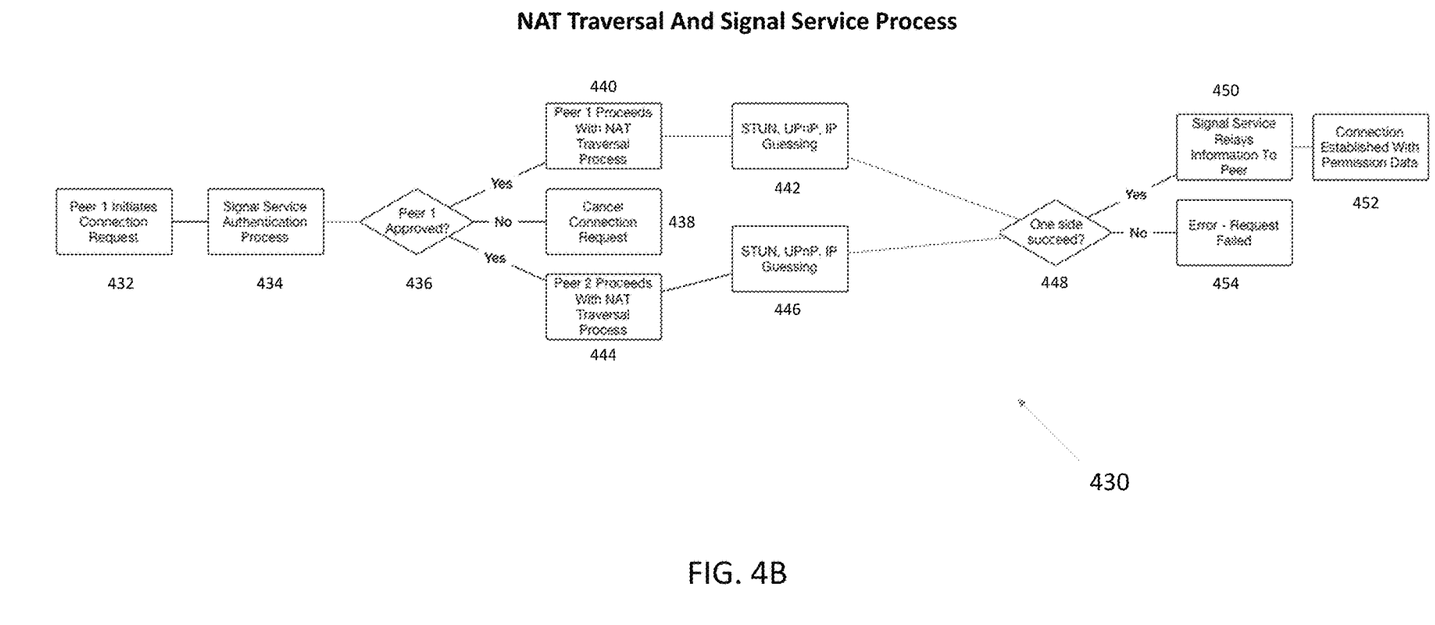
FIG. 4B is a flowchart detailing a method of establishing a peer-to-peer connection during a NAT traversal phase.

FIGS. 4A and 4B illustrate how two peers can establish a connection for streaming video for gaming. FIG. 4A shows the connection process 400 at a high level. This process 400 starts with a user launching a peer-to-peer video streaming application on his server computer (e.g., the first peer 110a in FIG. 1), which has a hardware H.264 or hardware H.265 encoder (e.g., encoder 122a). An authentication server 197 may check the compatibility of the user's computer 110a and inform the user if this computer can be used as a video-streaming server. (Together, the authentication server 197 and hole-punching/port database 199 implement a signal service 499 that is discussed in greater detail below.)

When the server 110b initiates, it confirms the identity of the person who launched the server 110b (404). Additionally, the authentication server 197 tells other video-streaming systems the local and wide area network Internet Protocol (IP) addresses. These IP addresses are recorded to make future connections. Additionally, the server 110b attempts to open the designated ports for video-streaming connections (406). If this attempt is successful, the host 110a uses its direct connection logic when the client 110b attempts to connect to the host 110a. If the host 110a is unable to do this using UPNP (Universal-Plug-and-Play) technology, the host 110a attempts to use a hole-punching technique to open ephemeral ports for a connection. This information is recorded in the hole-punching/port database 199.

The authentication server 197 receives information from the host 110a, including the IP addresses of the host 110a, allowing the host 110a to be identified for future connections (408).

Users have permission to access the host 110a if they used their account to launch video-streaming software on their own machines or if they were given permission to access the host 110a by another user (410). The hosts that a user has access to are listed in the video-streaming software run by the client 110b and also on a website or other repository. At this point, a user with access to this host 110a can initiate a connection via the website or client application on a second computer (e.g., client 110b in FIG. 1)(412). Prior to making a successful connection, the authentication server 197 tests the client 110b to ensure it has the proper hardware for a reliable connection to the host 110a. This test involves checking the hardware decoder and client operating system.

The connection request is sent to the authentication server 197. It confirms that this user has permission to connect and authorizes a one-time session token and Secure Sockets Layer (SSL) certificate for the connection (414). Once the host 110a is told that an authorized connection is being made with a proper session token, it begins to capture and encode video on as explained above (416).

The client 110b queries the port database 199 for the ports on the host 110a that are available for video streaming connections. This provides a turn-by-turn direction for how the client 110b can reach the host 110a. If the host 110a is unable to open ports and if the hole-punching technique detailed below fails, the client 110b attempts to open its own ports so that the host 110a can connect to the client 110b.

If the user has administrator or ownership rights to the host 110a, the video stream initiates immediately. If the user doesn't have these permissions, the host's owner may approve the connection manually. When either of those happens, video encoding begins, and the client 110b is able to start sending signals to the host 110a. The connection is made over TCP or BUD (described below).

Network Address Translator (NAT) Traversal and Signal Service Process

The host and client employ a multi-faceted strategy to connect with each other. On both ends of the connection, each peer first attempts to allow traffic through their NAT via Universal Plug and Play (uPnP). Connectivity is verified via a third-party negotiation server, called the signal service 499 (FIG. 4A). If either peer succeeds in forwarding the necessary ports via uPnP, a successful connection can be made.

As a second line of defense, the peers may also attempt to connect with each other via a technique called "UDP hole punching." In this case, both peers send traffic to the third-party negotiation server via a proprietary UDP protocol (BUD). The negotiation server then passes the "hole punched" port information to each peer, and the peers attempt to negotiate a direct connection.

Once the route is established, the host 110a and client 110b attempt a successful SSL handshake and confirm the user making the connection has permission to do so. After that, the host 110a begins capturing and encoding video and audio and sends the video and audio data to the client 110b.

A signal service 499 (FIG. 4A) is a system used to negotiate the peer-to-peer connection between two computers. It performs roughly the same function of the signaling service as outlined in the WebRTC specification. Before two clients running within unknown network configurations can make a successful peer-to-peer connection, they communicate basic information about their network location to their peer. The signal service 499 acts as a trusted intermediary to relay these informational messages between the two peers. The signal service 499 drops out of the connection as soon as a successful peer-to-peer connection has been accomplished. Communication between Clients and the signal service is done through JSON messages sent over persistent TCP Websocket connections.

FIG. 3B illustrates a process 430 for negotiating the peer-to-peer connection is as follows. A peer (either the host or the client) establishes a standard TCP Websocket connection to the signal service and identifies itself by its unique identifier (432). It then tells the signal service its originating IP address and the route to the local address (434). The signal service authenticates the server's authentication token (436), ensuring that authentication token is still valid and identifies the user as the owner of the server with its indicated server identifier.

At some later point, the other peer communicates that it wishes to make a peer-to-peer connection to the first peer. It establishes a standard TCP Websocket connection to the signal service, authenticates itself using its authentication token, and indicates the identifier of the peer to which it would like to connect.

If the connection is approved (436), both peers enter their NAT traversal phases (440, 444), sending candidate exchange packages to the signal service. (If not, the connection request is canceled 438.) Each peer proceeds with Session Traversal of UDP for NAT (STUN) (also called the signal service), UPnP, or guessing the open ports (442, 446) in its attempt to connect with the other peer. If one peer successfully connects to the other peer (448), the signal service acts as a relay (450), forwarding any candidate exchange messages from each peer. These candidate exchange messages contain possible IP addresses and ports to which each peer can try to establish a direct connection. The connection is established with permission data (452) or fails (454).

Each peer tries several methods to establish its location on a network during the NAT traversal phase (440, 442, 444, 446 in FIG. 4B) of a connection. It tries a UDP STUN process to detect and traverse network address translators that are located in the path between two endpoints of communication. At the same time, each peer also tries to establish its own address and ports using UPnP. As a last ditch effort, the peer tries to guess ports and the local network address. This information is then sent to signal service for relaying data to the other peer, which is going through the exact same process.

More specifically, the host may test uPnP, which is a set of protocols that enables a network connected device to open ports on a router for a specific connection. Many routers allow this protocol to open ports automatically, but sometimes it will fail. The inventive hole punching logic is built to handle those failures. If uPnP succeeds, the host 110*a* opens ports 8000-8004 and waits for a connection request from the client 110*b*. This successful connection is called a direct connection.

If uPnP fails, the host 110*a* can attempt to open ports via hole-punching logic. First, the host 110*a* sends a signal to the hole-punch database 199. This signal tell the database 199 that the host 110*a* is attempting to open ports via hole punching. When the client 110*b* tries to connect to the host 110*a*, the host 110*a* sends packets to the client 110*b*. These packets open ephemeral ports in the host network and router. The packets are dropped when they reach the client network because they're not recognized.

Once those packets are dropped, the client 110*b* attempts to connect to the host 110*a* via the ephemeral ports that the test packets were sent from. If this works, a successful connection is made via Hole Punching and all network connections are established via BUD. If this fails, the client 110*b* attempts to punch holes in its network router. It sends packets to the host network, expecting them to be dropped. The host 110*a* then uses the ephemeral ports that the dropped packets originated from to initiate a connection to the client 110*b*.

Once hole punching is complete, the network connections are managed by a proprietary networking protocol called BUD. As mentioned above, BUD is a protocol built on top of UDP. It provides low latency while maintaining a reliable connection. BUD recognizes when to retransmit a packet and when to accept some loss. This is done through several mechanisms. BUD maintains 100% reliability on header file packets and accepts some loss on other packets. BUD measures the frame loss on each packet transmission from the server (host 110*a*) to the client 110*b*. When significant loss is measured, it uses the H.264 video encoder settings to lower the overall bitrate of the video transmission by 50%. When there is no loss, BUD tells the encoder to begin to increase its acceptable bitrate until it reaches the maximum bitrate set by the user or until it starts to experience loss again as explained above with respect to FIG. 3B.

Co-Play

A single host can connect to multiple clients simultaneously. This feature is especially useful when streaming multi-player video games. It enables the owner of the host to invite his friends to connect via a process 500 shown in FIG. 5. The host owner creates a friendship with the owner of another peer (502). From that invitation and friending, the friend, or guest, has permission to request access to the host. When the request is made (504), the owner of the host, or hoster, grants permission to make a connection (506). (Alternatively, the hoster can deny permission (514), and the guest can either try again or give up (516)). The hoster can then hand permissions to the guest (508), including access to control the mouse, the keyboard, or a joystick on the hosting machine remotely. The guest can then interact with the host computer according to their permissions (570) until co-play ends (412). If the hoster makes the guest a friend, the hoster can save the friend's permissions for future co-play sessions.

Figure 5:
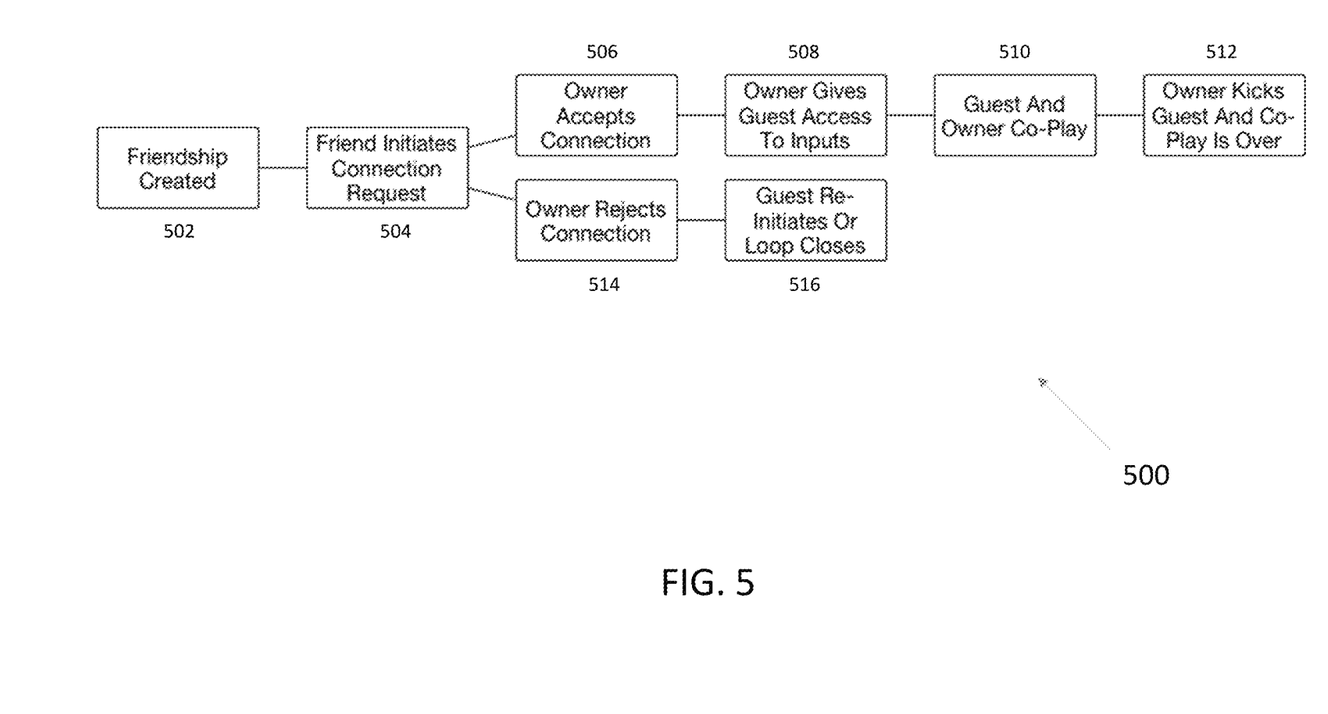
FIG. 5 is a flowchart detailing a method of creating a friendship connection between a host and a client.

Once the successful connection is made, the host 110*a* begins to capture the video, encode it, send it to the guest as compressed video, decode it on the guest's computer, and render it as described above. Inputs from the guest's computer (the client) is passed back to the host computer. The low-latency streaming technology that enables one user to play games when he's not at his computer or renting a computer in the cloud is being used to allow someone to play PC games on a friend's computer at the same time. With this technology, the two (or more) gamers can play video games together virtually that are running on only one host computer. The offline multiplayer modes of the games become online through video streaming, and gamers can play games as if they are sitting in the same room while being hundreds or thousands of miles away from each other.

Virtual Controller Features

When a guest connects to the host, the host may virtualize an Xbox 360 controller using a library called ViGEM. Inputs are registered on the guest computer via the software on that computer; these button presses are grabbed via SDL. As the buttons are pressed, the client and the host to pass input messages across the network connection uses a messaging system. As the guest user presses buttons, these messages are transferred to the host and registered via the virtual Xbox 360 controller. This simulates an interaction with the host similar to having a real Xbox 360 controller plugged into the host via a universal serial bus (USB). Passing the messages from the guest to the host is done on a separate thread from other processes to ensure the lowest latency possible for sending the input data.

Permissions on Keyboard, Mouse, Controllers, and Applications

Whenever a guest connects to a host computer, the guest either inherits permissions for access to input devices from their "friendship" with the host or, if they're not friends, is automatically granted access to controller access. When a guest has controller access, his button presses are recorded and sent to the host through an input messaging system. If the host turns off the permission for a specific user's input devices, the messages are no longer accepted by the host. All input are blocked until the host grants the guest access to the input devices again to allow messages to be passed to the host. This permission system prevents a guest from taking control of the host.

Figure 6:
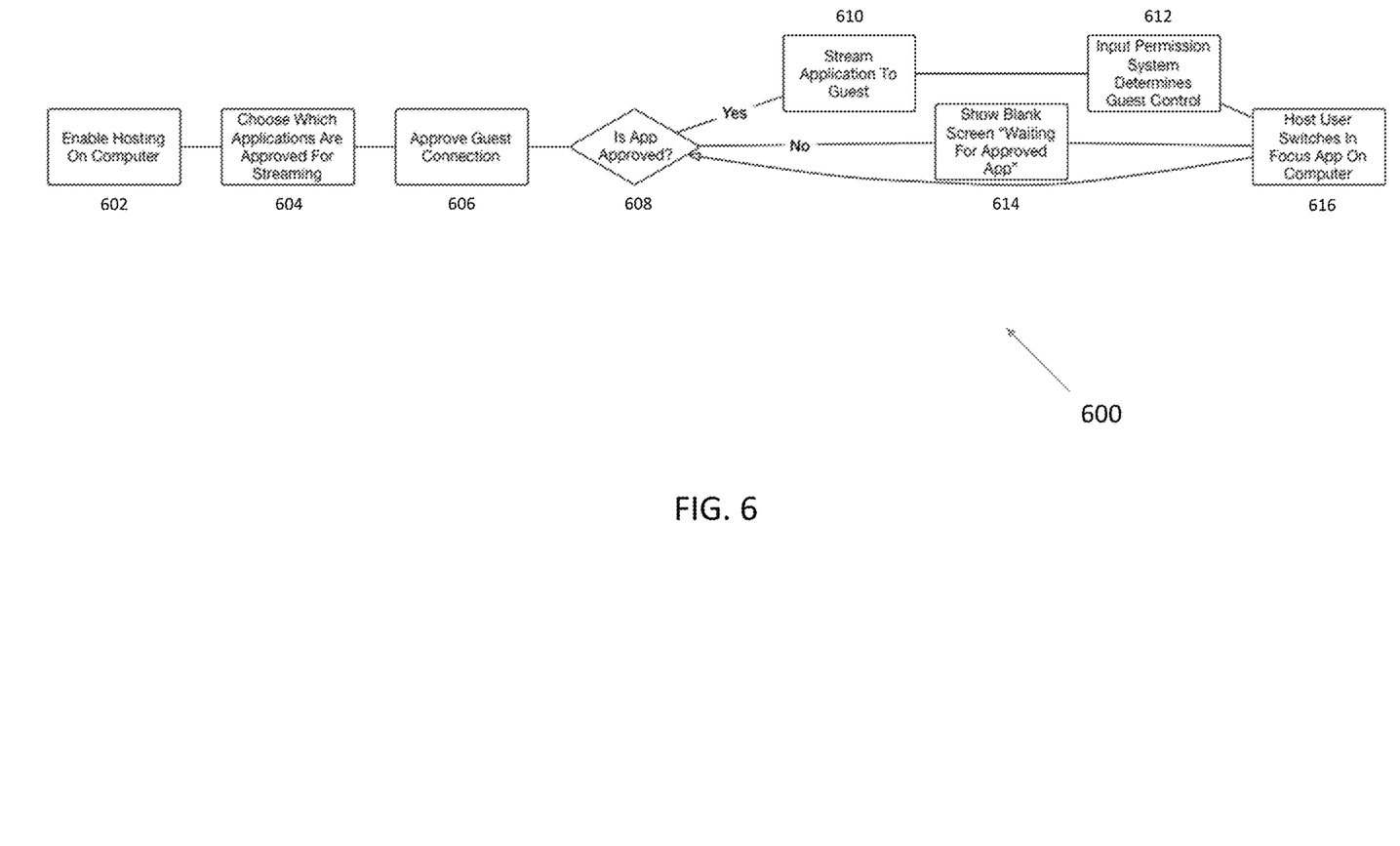
FIG. 6 is a flowchart detailing a method of approving an application for peer-to-peer streaming.

FIG. 6 illustrates a process 600 for adding another layer of security to a video streaming session. This process 600 locks users into only those windows or application approved by the person hosting the gaming session. The hoster enables hosting on his peer (602), then approves one or more applications for video streaming (604). These approved windows or applications are added to a whitelist of applications that are managed by the hoster.

When the guest connects to the host (606) and tries to view a particular window, the host determines whether the application has been approved for streaming (508). If so, the host streams the application to the guest (510). Similarly, an input permission system determines which input devices that the guest can control (512). If the application is not on the list of approved applications, the guest sees a blank screen notifying them that they are not approved to see that window (514). This continues until the hoster changes focus to another applications open on the host (516).

Limiting access to windows and applications locks the guest into approved applications and out of other applications. It prevents unattended access and private information from being shared with a guest. When one of the approved applications is opened again, an IFrame is sent from the host computer to the guest computer to re-initiate the video streaming session. When the video re-initiates, the guest can use the controller, mouse, keyboard, or his combination of approved access for interacting with the approved application.

Party Finder

Game Finder combines the low-latency streaming, co-play functionality, peer-to-peer NAT traversal, virtualized controllers, input permissions, and approved applications to deliver a unique new way to play video games. It also enables matchmaking, which allows random gamers to connect online and play games that do not have online functionality over the internet.

Game Finder emulates the classic gaming scenario where several friends sit on a couch and play video games together. Game Finder allows people who own a game and a gaming PC to let other people in the video-streaming community know that they're looking for friends to play the games with. Members of the community who match certain parameters, such as distance from the host, bandwidth availability, player ranking, interest, see hosts who they can game with.

The matchmaking process takes into account a client's distance from the host so that the client will have a good, low-latency connection to the host and the overall bandwidth availability to confirm that video quality will be high enough for gaming. For those guests and hosters who match on distance and bandwidth, guests can search for hosters based on interest in a particular game. When the guest user asks to join the host's game, they will be placed in a waiting room, while an authentication server confirms that a high-quality network connection can be made between the two computers. After that, the hoster can approve the connection request from the guest.

The client and host are then connected in a peer-to-peer, low-latency game streaming session as described above. The guest can see and interact only with the program that the host listed for this gaming session. The guest has access to only the gaming controller permission, but the host may grant access to other input devices. With the connection established, the host can invite others to join the gaming session for a multiplayer connection or the guest and host can start gaming together over the internet, just like they were sitting in the same room.

CONCLUSION

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of peer-to-peer streaming video, the method comprising:
   establishing a connection between a first peer and a second peer on a computer network;
   capturing a video frame from a first graphics processing unit (GPU) on the first peer;
   determining at least one of a quantization parameter (QP) or a bit rate based on the connection between the first peer and the second peer;
   compressing the video frame to form a compressed video frame in a first hardware encoder on the first peer based on the at least one of the QP or the bit rate; and
   transmitting the compressed video frame from the first peer to the second peer,
   wherein capturing the video frame, compressing the video frame, and transmitting the compressed video frame occur without copying the video frame from the first GPU to a central processing unit (CPU).

2. The method of claim 1, wherein establishing the connection between the first peer and the second peer comprises at least one of:
   requesting, by the first peer, a connection to the second peer via a Session Traversal of User Datagram Protocol (UDP) through Network Address Translators (NATs) (STUN) server;
   establishing, by the first peer, a network address and a port via a universal Plug-and-Play (uPnP) protocol; or
   sending a first packet from a first port on the first peer to the second peer, detecting that the first packet has been dropped, and receiving a second packet from the second peer at the first port.

3. The method of claim 1, wherein establishing the connection comprises establishing a first connection for audio data, a second connection for video data, a third connection for cursor data, and a fourth connection for user input.

4. The method of claim 1, wherein capturing the video frame comprises capturing the video frame from a back buffer of the first GPU.

5. The method of claim 1, wherein determining the at least one of the QP or the bit rate is based on at least one of a bandwidth, latency, or frame drops of the connection.

6. The method of claim 1, wherein the first hardware encoder compresses the video frame using at least one of an H.264 compression standard or an H.265 compression standard.

7. The method of claim 1, further comprising:
   rendering the video frame on the first peer with the first GPU.

8. The method of claim 1, further comprising:
   converting the video frame from a first color format to a second color format with at least one shader on the first GPU.

9. The method of claim 1, further comprising:
   decompressing the compressed video frame at the second peer to recover the video frame; and
   rendering the video frame on the second peer with a second GPU.

10. The method of claim 1, further comprising, before establishing the connection:
    setting at least one permission on the first peer, the at least one permission limiting access by the second peer to an application window rendered by the first GPU on the first peer when the application window is rendered in a foreground of a display of the first peer.

11. The method of claim 1, wherein the video frame is from an app executed by the first peer, and further comprising, before establishing the connection:
issuing an invitation from the first peer to use the app.

12. The method of claim 1, further comprising, before establishing the connection:
receiving, by the first peer from a server, an indication of a match to the second peer, the match based on at least one of a distance between the first peer and the second peer or bandwidth available for the connection between the first peer and the second peer.

13. A method of peer-to-peer streaming video, the method comprising:
establishing a connection between a first peer and a second peer on a computer network;
capturing a video frame from a first graphics processing unit (GPU) on the first peer;
storing the video frame in a memory of the first GPU;
converting the video frame from a first color format to a second color format with at least one shader on the first GPU;
determining at least one of a quantization parameter (QP) or a bit rate based on at least one of a bandwidth, latency, or frame drops of the connection between the first peer and the second peer;
compressing the video frame to form a compressed video frame in a first hardware encoder on the first GPU based on the at least one of the QP or the bit rate using at least one of an H.264 compression standard or an H.265 compression standard; and
transmitting the compressed video frame from the first peer to the second peer,
wherein capturing the video frame, compressing the video frame, and transmitting the compressed video frame occur without copying the video frame from the first GPU to a central processing unit (CPU).

* * * * *